United States Patent [19]

Shimizu

[11] 4,245,814
[45] Jan. 20, 1981

[54] FLUID SHUT-OFF DEVICE

[76] Inventor: Kunio Shimizu, 33-2, Asagaya-Minami 1-chome, Suginami-ku, Tokyo, Japan

[21] Appl. No.: 18,050

[22] Filed: Mar. 6, 1979

[30] Foreign Application Priority Data

Mar. 6, 1978 [JP] Japan .................................. 53-28328
Jan. 29, 1979 [JP] Japan .................................. 54-8227

[51] Int. Cl.³ .............................................. F16K 31/08
[52] U.S. Cl. ........................................ 251/65; 137/39; 236/48 A; 236/DIG. 3; 251/68
[58] Field of Search ........................... 137/38, 457, 39; 251/11, 65, 69, 68; 236/48 A, DIG. 3

[56] References Cited

U.S. PATENT DOCUMENTS

| 2,652,065 | 9/1953 | Kutzler ................................ 251/69 |
| 2,684,074 | 7/1954 | Kutzler et al. ....................... 251/69 |
| 2,781,979 | 2/1957 | Kraft .................................. 236/48 A |
| 3,783,887 | 1/1974 | Shoji .................................. 137/38 |
| 3,965,917 | 6/1976 | Speck .................................. 137/38 |
| 4,098,284 | 7/1978 | Yamada ................................ 137/39 |
| 4,167,194 | 9/1979 | Matsuda .............................. 137/38 |

*Primary Examiner*—Martin P. Schwadron
*Assistant Examiner*—G. L. Walton
*Attorney, Agent, or Firm*—Wenderoth, Lind & Ponack

[57] ABSTRACT

A fluid shut-off device is provided which comprises a non-magnetic casing having a fluid passage therein, a metallic valve body movably disposed in the casing to close the passage at one operative position, and a magnetic member slidably disposed outside the casing and magnetically attracting the valve body. The magnetic member takes an inoperative position against a spring force and is locked at this position. The lock is released by a bimetallic strap deformable by supply of an electric current. When the lock is released, the magnetic member is moved by the action of the spring force, so that the valve body magnetically attracted by the magnetic member is also moved to the operative position to shut off the flow of fluid material through the passage.

6 Claims, 11 Drawing Figures

FLUID SHUT-OFF DEVICE

BACKGROUND OF THE INVENTION

This invention relates to a device for shutting of the flow of fluid, such as gaseous fuel, in case of emergency such as an earthquake or accidental leakage of explosive gas.

In the case of an earthquake or accidental leakage of explosive gaseous fuel, it is required to shut off the flow of the gaseous fuel from a supply pipe or tank without fail to avoid secondary accidents caused by explosion of the gaseous fuel. It is desired that fluid shut-off device provided for such purpose not consume any electric power in the normal inoperative position and, once operated, maintain the operative shut-off position in spite of interruption of the electric current. A more important requirement is that such a fluid shut-off device have a very high reliability. To this end, it is desired that the device becomes operative by a very small amount of electric current and almost instantaneously after supply of the current. Also, the force for shutting off the flow of the fluid has to be sufficiently high.

The fluid shut-off devices hitherto provided could not satisfy the above requirements simultaneously. Also, the conventional devices of this kind have been relatively complex and expensive.

Accordingly, an object of the present invention is to provide a fluid shut-off device which is operable with high reliability by a small amount of electric current immediately after supply thereof.

Another object of the present invention is to provide a fluid shut-off device which can provide sufficient power to interrupt the flow of the fluid material when operated and which maintains the operated position until manually reset to an inoperative position.

A further object of the present invention is to provide a fluid shut-off device which is operated in connection with a detector of gas leakage or an earthquake.

Still another object of the present invention is to provide a fluid shut-off device which, once operated, holds the operated position without any supply of electric current.

Another object of the present invention is to provide a fluid shut-off device which is simple in structure and relatively inexpensive.

SUMMARY OF THE INVENTION

A fluid shut-off device of the present invention comprises a casing made of non-magnetic material and having a passage therethrough which is adapted to be connected to a fluid supply line, a metallic valve body movably disposed in a valve chamber formed inside the casing, and a slide member provided outside the casing. One of the valve body and the slide member is formed of permanent magnet material to magnetically attract with the other the slide member and the valve body. The slide member is urged to an operative position where the valve body closes the passage. The slide member normally takes another inoperative position against an elastic force of urging means by locking means. The locking means is released by deformation of a bimetallic strap when an electric current is supplied thereto.

Preferably, the locking means comprises a leaf spring supported in a cantilever manner and having an elasticity tending to flex inwardly. The leaf spring crosses over the bimetallic strap, which has a bridge-shape to hold the metal strap in a locking position in the inoperative position, but which is deformed by application of the electric current to displace the metal strap to an unlocking position.

Other objects and features of the present invention will become apparent from the following detailed description of preferred embodiments thereof when taken in conjunction with the accompanying drawings, in which:

BRIEF DESCRIPTION OF THE DRAWINGS

FIGS. 1(a)–1(d) show a fluid shut-off device of the present invention in an inoperative position, in which FIG. 1(a) is a top plan view, FIG. 1(b) is a side view, FIG. 1(c) is a longitudinal sectional view, and FIG. 1(d) is a cross sectional view taken along line A—A in FIG. 1(a), FIGS. 2(a)–2(d) show the fluid shut-off device of the present invention in an operated position, in which

DETAILED DESCRIPTION OF THE INVENTION

Figure 1A:
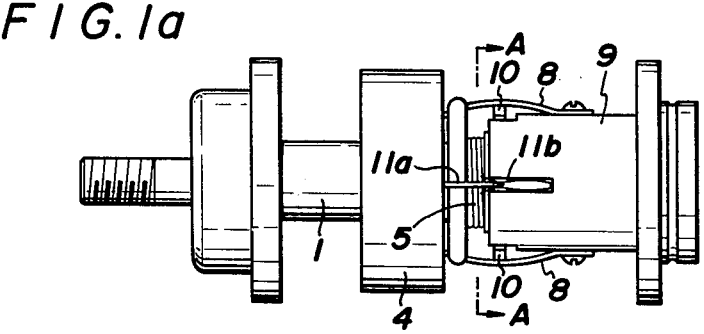
Figure 1B:
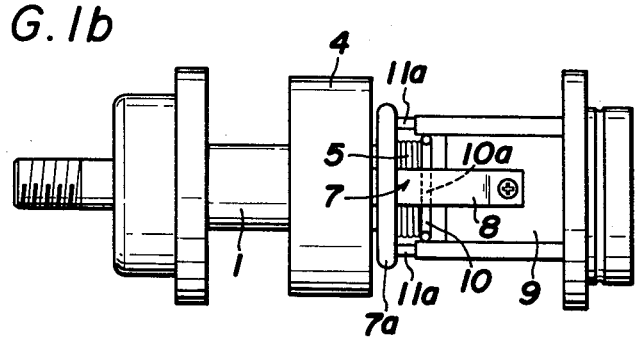
Figure 1C:
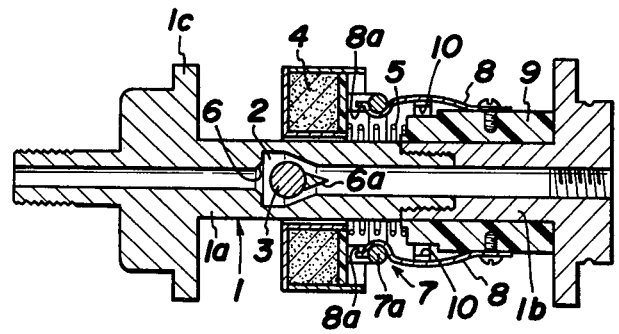

Referring to a fluid shut-off device of the present invention with reference to FIGS. 1(a)–1(d) showing the device in an inoperative position, an elongated casing 1 is formed by threadedly engaging two sections 1a and 1b, both of which are made of non-magnetic material such as aluminum or plastics. The casing 1 is adapted to be connected to a fluid supply line and has a central axial passage therethrough. The axial passage in the casing 1 is partially enlarged to form a valve chamber 2, in which a valve body 3 made of magnetic material is movably disposed. Provided externally around the casing 1 is an annular magnetic member 4 which is urged toward an annular flange 1c on the casing 1 by an extensible coil spring 5. In the position shown in FIG. 1, the magnetic member 4 is shifted against the spring force and set to this inoperative position by a locking means 7, described hereinafter in detail. One of the valve body 3 and the annular magnetic member 4 is made of a permanent magnet. In this embodiment, the annular magnetic member is made of a permanent magnet, so that the magnetic attractive force is developed between the annular magnetic member 4 and the valve body 3. Due to such magnetic attractive force, in the inoperative position shown in FIGS. 1(a)–1(d), the valve body 3 is separated from a valve seat 6 and bears on a stopper 6a to allow the fluid material such as gaseous fuel to flow through the central axial passage.

Figure 1D:
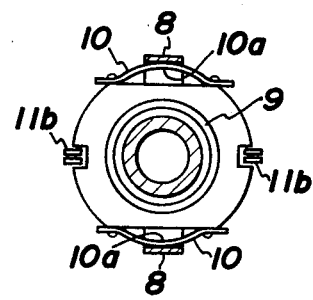
Figure 2A:
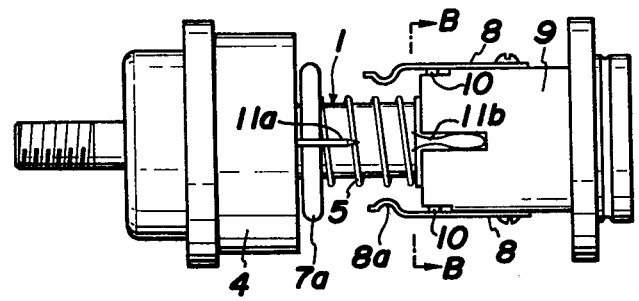
FIG. 2(a) is a top plan view.
Figure 2B:
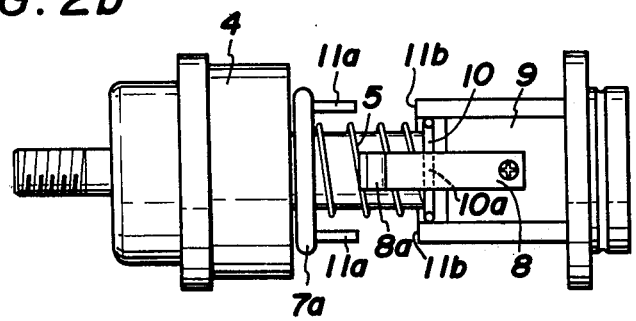
FIG. 2(b) is a side view.
Figure 2C:
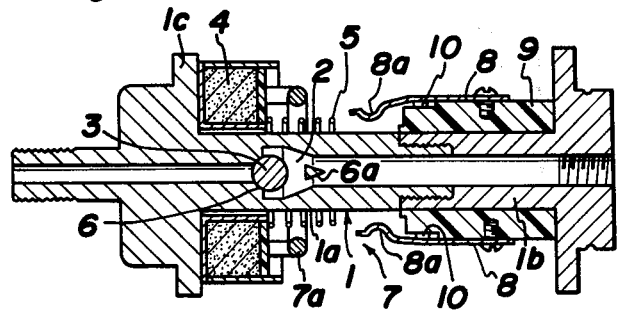
FIG. 2(c) is a longitudinal sectional view.
Figure 2D:
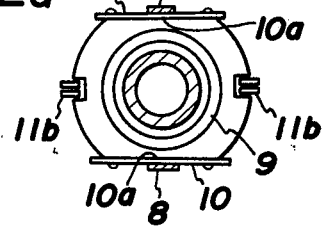
FIG. 2(d) is a cross sectional view taken along line B—B in FIG. 2(a)

The locking means 7 for holding the annular magnetic member or permanent magnet 4 to the inoperative position against the spring 5 comprises a ring 7a mounted to the annular magnet 4 and a pair of metal straps 8 each having a hook 8a at the free end thereof engagable with the ring 7a. The metal strap 8 is made of a leaf spring and connected at the other end thereof to an electrically insulative member 9 in a cantilever manner. The member 9 is attached to the outer peripheral surface of the casing 1. The hook 8a at the free end of the metal strap has a semi-circular recess in which the ring 7a is snugly received. The metal strap 8 retains an elasticity tending to flex inwardly in a direction to separate from the ring. Such inward flexion or movement of each metal strap 8 is prevented by a bridge-shaped bimetallic strap 10 mounted on the insulative member 9 as best shown in FIG. 1(d). The bridge-shaped bimetallic strap 10 upholds the metal strap in such a manner that the metal strap 8 crossing over the bimetallic strap 10 is slightly bent outwardly at the cross point 10a and that the hook 8a at the free end of the metal strap is resiliently engaged with the ring 7a.

Figure 4:
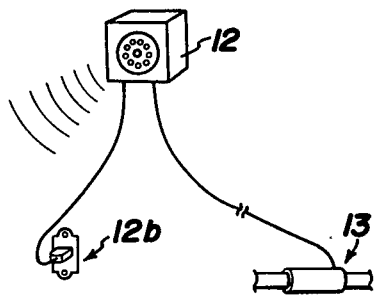
FIG. 4 is a perspective view showing the operation of the fluid shut-off device.

Each bimetallic strap 10 has lead wires (not shown) connected to both of the ends thereof. An electric current is supplied to the lead wires through movable contacts 11a mounted on the annular magnetic member 4, i.e. permanent magnet, and fixed contacts 11b provided on the insulative member 9, both contacts being connected with each other in the inoperative position shown in FIGS. 1(a)-1(d). The lead wire from the bimetallic strap 10 as well as a lead wire from the movable contact is connected to an electric power source through a relay operated by a detector for leaked gas, earthquake or the like, as shown in FIG. 4.

Although not shown in the drawings, the metal strap 8 is coated with an electrical insulative material at the underside intersecting with the bimetallic strap so as to electrically insulate the bimetallic strap from other metallic parts of the device.

In such an inoperative position of the present device, when an electric current is supplied to the bimetallic straps 10 by the action of the detector for leaked gas, earthquake or the like, each bimetallic strap 10 generates heat in itself by the supplied electric current and starts bending inwardly. Therefore, as shown in FIGS. 2(a)-2(d), the bridge shape of the bimetallic strap 10 is immediately collapsed by the stress inwardly applied to the top of the bridge by the metal strap 8, which tends to bend inwardly due to its own elasticity. Thus, the bimetallic straps 10 are flattened and the metal straps 8 are moved inwardly, with the result that the hooks 8a at the free ends of the metal straps are disengaged from the ring 7a on the annular magnet 4. By this disengagement of the hooks 8a from the ring 7a, the annular magnet 4 is shifted toward the annular flange 1c by the action of the spring 5. Accordingly, the valve body 3 in the valve chamber 2 is also shifted by the magnetic attractive force of the magnet 4 and rests upon the valve seat 6 to interrupt the flow of the fluid material through the axial center passage of the casing 1. At this time, the movable contacts 11a are separated from the fixed contacts 11b, so that the supply of the electric current to the bimetallic straps is also interrupted.

Figure 3:
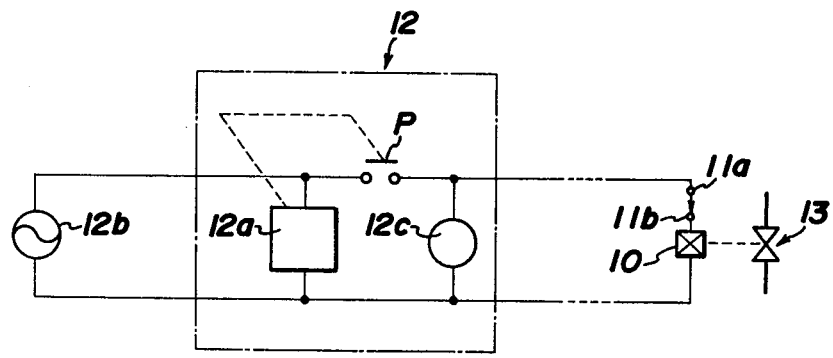
FIG. 3 is a diagram showing an electric circuit for operating the fluid shut-off device by an electric signal from a detector for gas leakage.

It is preferable to use the present device in connection with a gas alarm 12 as shown in FIG. 3. The gas alarm 12 is composed of a detector 12a for leaked gas and a buzzer 12c actuated by means of a normally open contact P associated with the detector 12a. The detector is a known one made of a semiconductor. When the detector 12a detects the leakage of gas, due to the change of conductivity of the semi-conductor thereof, the contact P associated with the detector is closed, whereby the alarm sound is generated by an electric current supplied from the electric source 12b. Simultaneously, the electric current is supplied also to the bimetallic straps of the present device, so that the present device is operated to interrupt the flow of the gaseous fuel therethrough. Once the present device is operated, it keeps taking the operated position even after the gas detector 12a returns to the normal inoperative or non-detecting conditions. Then, after completely resolving the problems of gas leakage, the annular magnet 4 is pushed back against the spring 5 and set to the locking position by engaging the hooks 8a of the metal straps 8 with the ring 7a on the magnet 4.

FIG. 4 shows a practical manner how to connect the present device 13 with the gas alarm 12 and the electric power source 12b. Thus, in the present invention, no electric current is required to maintain the inoperative position of the present device. When used in connection with the known gas alarm, only a small amount of electric current is supplied continuously to the alarm but not to the present device. Also, no electric current is required to maintain the operative position of the present device, so that the consumption of the electric power is negligible in the present device. Although it is shown in FIGS. 3 and 4 to use alternating current as the electric power source of the present device, the power source may be dry batteries in case the bimetallic strap is formed into a narrow lead shape.

Figure 5:
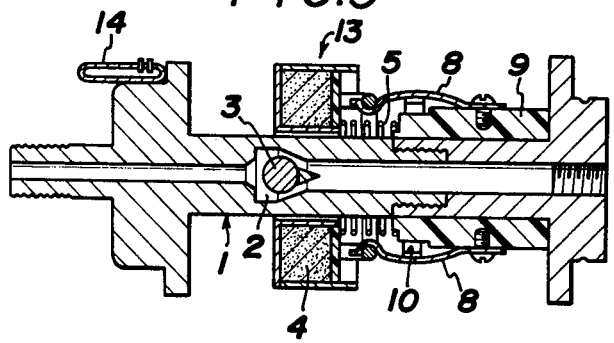
FIG. 5 is a longitudinal sectional view showing the fluid shut-off device made to be operable by detecting an earthquake.

In another embodiment of the present invention shown in FIG. 5, the present device is made to be operated by detecting an earthquake. To this end, a mercury switch 14 is provided in connection with the present device. The mercury switch 14 is provided in series between the electric power source and the bimetallic strap 10, whereby when the switch 14 is closed by inclination thereof due to an earthquake, the electric current is supplied to the bimetallic strap 10 to operate the device in the same way as set forth above.

Although the present invention has been described with reference to the preferred embodiments thereof, many modifications and alterations may be made within the spirit of the present invention. For example, the movable valve body 3 in the valve chamber 2 may be any shape other than ball shape. Also, the present device can be used to shut off not only gaseous fuel but also other gases and liquids.

What is claimed is:
1. A fluid shut-off device comprising:
a casing made of non-magnetic material, said casing having therethrough a passage which is adapted to be connected with a fluid supply line, and said casing having therein a valve chamber at a midportion of said passage;
a valve body positioned in said valve chamber for movement between a first position to close said passage and a second position to open said passage;
a slide member provided outside said casing;
at least one of said valve body and said slide member being made of permanent magnet material and the other of said slide member and said valve body being made of magnetic material, whereby said valve body and said slide member are magnetically attracted to each other;
elastic spring means for urging said slide member toward an operative position whereat said valve body is at said first position thereof and closes said passage;
locking means for holding said slide member against the force of said spring means at an inoperative position whereat said valve body is at said second position thereof and opens said passage, said locking means comprising a metal strap having a free end bendable from a first locking position to a second unlocking position; and means for releasing said metal strap from said first locking position thereof, said releasing means comprising a bimetallic strap deformable by supply thereto of an electric current, said bimetallic strap being provided adjacent to said metal strap to allow said free end to bend into said second unlocking position when said electric current is supplied to said bimetallic strap.

2. A fluid shut-off device as claimed in claim 1, wherein said slide member is an annular permanent magnet slidably mounted around said casing; and said metal strap of said locking means is connected to said casing in a cantilever manner, the free end of said metal strap being engageable with a member connected to said permanent magnet.

3. A fluid shut-off device as claimed in claim 1, wherein said bimetallic strap is formed in a bridge-shape over which said metal strap crosses, said metal strap being made of a leaf spring and tending to flex inwardly against said bimetallic strap, said bimetallic strap keeping said bridge-shape to hold said metal strap in said first locking position thereof at said inoperative position but being deformed by said metal strap upon application of the electric current thereto to displace said metal strap to said second unlocking position thereof.

4. A fluid shut-off device as claimed in claim 3, wherein said metal strap is provided with an electrically insulative material on the underside thereof to be electrically isolated from said bimetallic strap.

5. A fluid shut-off device as claimed in claim 1, wherein said bimetallic strap is connected to an electric power source through means for detecting leakage of the fluid, said detecting means closing a contact in a circuit to supply the electric current to said bimetallic strap.

6. A fluid shut-off device as claimed in claim 1, wherein said bimetallic strap is connected to an electric power source through a mercury switch.

* * * * *